United States Patent [19]
Hauff

[11] Patent Number: 5,921,284
[45] Date of Patent: Jul. 13, 1999

[54] SHRINK-TYPE WALL FEEDTHROUGH FITTING

[75] Inventor: Werner Hauff, Ballmertshofen, Germany

[73] Assignee: Hauff-Technik GmbH & Co. KG, Herbrechtingen, Germany

[21] Appl. No.: 08/782,765

[22] Filed: Jan. 13, 1997

[30] Foreign Application Priority Data

Feb. 24, 1996 [DE] Germany .................... 196 07 085

[51] Int. Cl.⁶ ................. F16L 21/02; F16L 9/18
[52] U.S. Cl. ............. 138/114; 138/111; 138/97; 277/314
[58] Field of Search .................. 277/314, 315, 277/316, 604; 254/134.4; 405/154; 285/161, 177, 15; 432/29; 138/105, 92, 97, 94, 114, 111

Primary Examiner—Denise L. Ferensic
Assistant Examiner—Davis D. Hwu
Attorney, Agent, or Firm—Herbert Dubno; Andrew Wilford

[57] ABSTRACT

A wall feedthrough fitting for a conduit has a guide tube centered on an axis, adapted to be mounted in a wall with the conduit passing axially through the tube, and having an outer end of a predetermined inside diameter. A flexible and shrinkable sleeve generally centered on the axis has an inner portion secured to an outer surface of the guide-tube outer end and a shrinkable outer portion projecting axially outward past the outer end. A support tube of generally the same inside diameter as the guide tube is releasably coaxially fitted with the guide-tube outer end, and is fitted in, lines and supports the outer portion of the sleeve.

12 Claims, 2 Drawing Sheets

5,921,284

SHRINK-TYPE WALL FEEDTHROUGH FITTING

FIELD OF THE INVENTION

The present invention relates to a wall feedthrough fitting. More particularly this invention concerns such a fitting used around conduits such as pipes and cables where they traverse a wall and provided with a heat-shrink tube for sealing around the conduits.

BACKGROUND OF THE INVENTION

When a conduit—an electrical, coaxial, or fiberoptic cable, a hose, or the like—must pass through a wall it is standard to fit the wall with a guide tube of substantially larger inside diameter than the outside diameter of the conduit or conduits that will traverse it. Such a guide tube is cast into place in a concrete wall with its ends projecting from the respective faces of the wall. After the conduit is snaked through the tube it is necessary to provide a tight seal between the tube and the conduit. Such a seal is typically needed to act as a fire stop, that is to prevent a fire on one side of the wall from propagating through the guide tube to the other side of the wall.

Recourse has thus been had to shrink sleeves that are fitted over the guide tube and cable and then heated so that they shrink tightly into place, forming a very good seal. Such seals are typically delivered in stretched condition mounted on a coil that holds them open and that is used to install them. Once in place the support coil is screwed out and then the sleeve is heated, normally by application of hot air, for the final installation.

A problem with this system is that the shrink sleeve must be threaded over the tube and conduit, so that it is virtually impossible to avoid getting dirt and other foreign matter inside the sleeve, which foreign matter is spread around as the coil is withdrawn. The coil itself presents a disposal problem, and such a sleeve cannot normally conform tightly to longitudinally grooved or ribbed conduits. During installation of the conduit through the unshrunk assembly it is possible for the conduit to catch or hang up on the support coil, and when the coil is removed helical ridges are left that can create a leak. Furthermore it is impossible with this system to provide a sealing agent or caulk inside the sleeve as it would be wiped off as the cable is pulled through it and when the support coil is removed, so that longitudinal grooves formed in cable insulation are not adequately sealed.

OBJECTS OF THE INVENTION

It is therefore an object of the present invention to provide an improved wall feedthrough fitting of the heat-shrink type.

Another object is the provision of such an improved wall feedthrough fitting of the heat-shrink type which overcomes the above-given disadvantages, that is which is inexpensive to manufacture and easy to use.

A further object is to provide such a fitting where the sleeve is protected prior to use and is easily freed of its support.

SUMMARY OF THE INVENTION

A wall feedthrough fitting for a conduit has according to the invention a guide tube centered on an axis, adapted to be mounted in a wall with the conduit passing axially through the tube, and having an outer end of a predetermined inside diameter. A flexible and shrinkable sleeve generally centered on the axis has an inner portion secured to an outer surface of the guide-tube outer end and a shrinkable outer portion projecting axially outward past the outer end. A support tube of generally the same inside diameter as the guide tube is releasably coaxially fitted with the guide-tube outer end, and is fitted in, lines and supports the outer portion of the sleeve.

This sleeve is therefore able to fully protect the shrink sleeve from damage as conduits are snaked through it while at the same time its smooth inner surface cannot snag on or damage such conduits. Thus the sleeve remains perfectly clean and smooth until the support tube is removed. At the same time the overall fitting takes up no more wall space than the finished assembly, so such feedthroughs can be grouped together and used with ease.

According to the invention a layer of a lubricating and sealing substance is provided on an outer surface of the guide tube between the guide tube and the sleeve. In an installation where the support tube has an inner end telescoping with the outer end of the guide tube, that is where the support-tube inner end engages around the guide-tube outer end, such lubricating/sealing substance is provided between the tubes where they overlap to facilitate axial removal of the support tube.

The guide tube in accordance with the invention is formed with axially extending weakening formations allowing the tube to be split axially. The formations can include at least one axially throughgoing split or at least one axially throughgoing weakening line. Two such formations can be provided diametrally opposite each other on the support tube.

In addition according to the invention the support tube has an outer end formed with a radially outwardly projecting flange. The inner portion of the sleeve is bonded, for instance by an adhesive to the outer end of the support tube.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
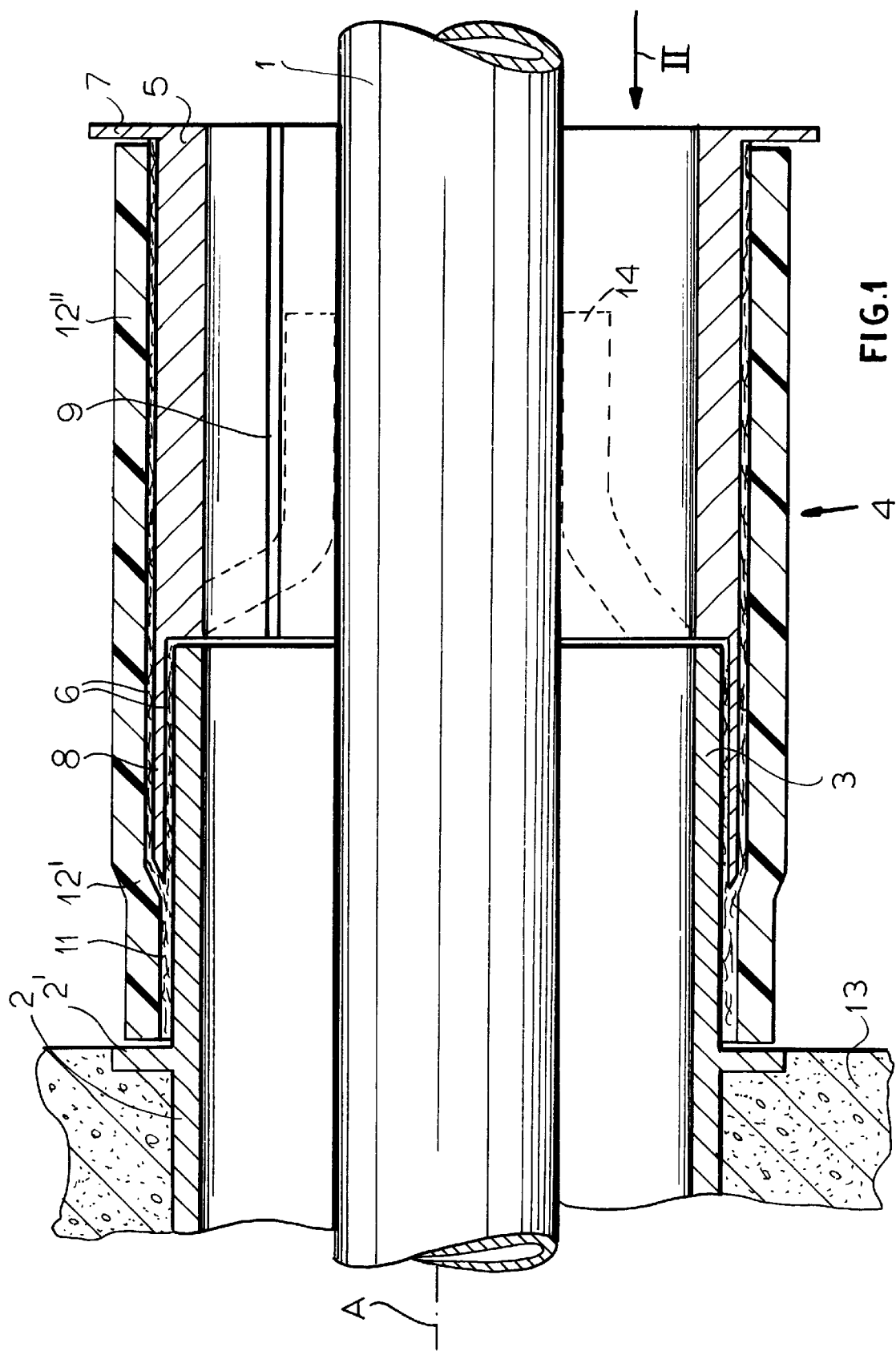
FIG. 1 is an axial section through the feedthrough fitting according to the invention.
Figure 2:
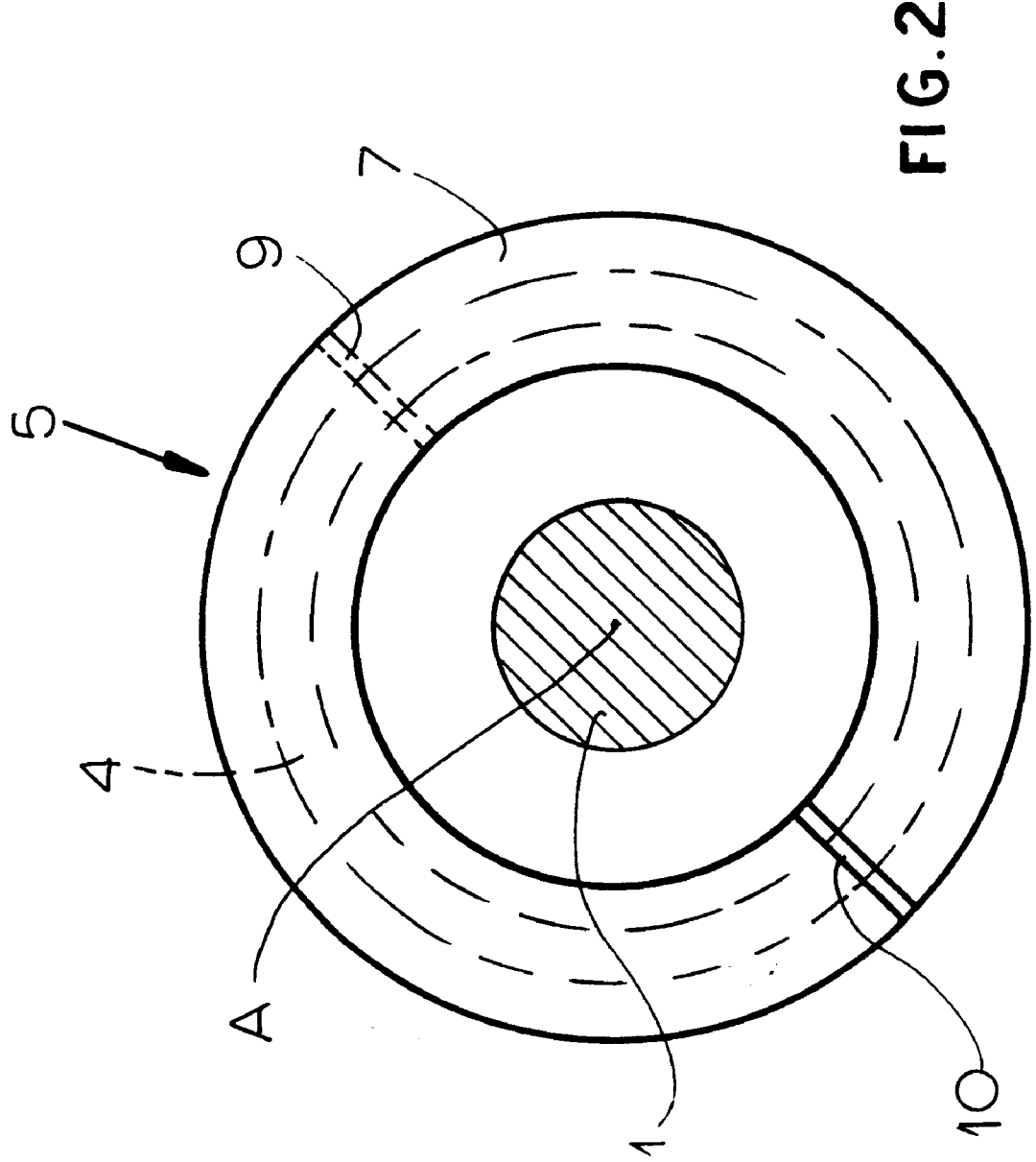
FIG. 2 is an end view taken in the direction of arrow II of FIG. 1.

As seen in FIGS. 1 and 2 a feedthrough fitting is mounted in a wall 13 and has a cylindrical guide tube 2 set in the wall 13 with a flange 2' resting against a face of this wall 13 and a cylindrical extension or end 3 projecting axially outward from the wall 13. A conduit 1, here an electrical cable, passes axially through the tube 2 although of course several such conduits 1 could be easily accommodated.

According to the instant invention a heat-shrink tube or sleeve 4 of cylindrical shape and centered on the axis A has an inner portion 12' engaged over the protruding end 3 of the tube 2 and an outer portion 12" projecting axially outward past this end 3. An adhesive 11 bonds an inner region of the inner end portion 12' of the tube 4 to the tube extension 3. A sacrificial support tube 5 of the same inside diameter as the tube 2 is engaged in the outer portion 12' and supports it, with a flange 7 at the end of this tube 5 protecting the shrink sleeve 4 as the cable 1 is threaded through the fitting.

An inner end portion 8 of the support tube 5 is engaged over and telescopes with an outer end region of the extension 3 so that the tubes 2 and 5 remain perfectly coaxial and solidly seated in one another. In addition the outer surface of the outer region of the extension 3 as well as the entire outer surface of the support tube 5 are coated with a layer 6 of a lubricant that also acts as a sealant. Furthermore the tube 5 is formed with weakening formations constituted as a groove or weakened line 9 and/or (see FIG. 2) a through-going split 10. Each of these formations 9 and 10 extends the full axial length of the tube 5 and the full radial extent of the flange 7.

With the system of this invention the entire assembly as it appears in FIG. 1 is permanently mounted in the wall 13 and the conduit or conduits 1 are threaded through it. Once the installation is complete the support tube 5 is pulled axially out, to the right in FIG. 1 until it is clear of the sleeve 4. The lubricant inside the sleeve 4 and on the extension 3 makes it easy to slide off the tube 5.

Then the tube 5 is broken at the weakening formations 9 and 10 and separated from the conduit 1, an operation that can normally be done with bare hands. Heat is applied to the projecting end 12" to shrink it as shown in dot-dash lines at 14 so that it tightly hugs and seals around the conduit 1. The lubricant inside the projecting end 12" will seal tightly around the conduit 1, filling for examples any longitudinal score lines caused by pulling the conduit 1 into place.

I claim:

1. A wall feedthrough fitting for a conduit, the fitting comprising:
    a guide tube centered on an axis, adapted to be mounted in a wall with the conduit passing axially through the tube, and having an outer end of a predetermined inside diameter;
    a flexible and shrinkable sleeve generally centered on the axis and having an inner portion secured to an outer surface of the guide-tube outer end and a shrinkable outer portion projecting axially outward past the outer end; and
    a support tube of generally the same inside diameter as the guide tube, releasably coaxially fitting with the guide-tube outer end, and fitted in, lining, and supporting the outer portion of the sleeve.

2. The wall feedthrough fitting defined in claim 1, further comprising:
    a layer of a lubricating and sealing substance on an outer surface of the guide tube between the guide tube and the sleeve.

3. The wall feedthrough fitting defined in claim 1, wherein the guide tube is formed with axially extending weakening formations allowing the tube to be split axially.

4. The wall feedthrough fitting defined in claim 3 wherein the formations include at least one axially throughgoing split.

5. The wall feedthrough fitting defined in claim 3 wherein the formations include at least one axially throughgoing weakening line.

6. The wall feedthrough fitting defined in claim 3 wherein two such formations are provided diametrally opposite each other on the support tube.

7. The wall feedthrough fitting defined in claim 1 wherein the support tube has an outer end formed with a radially outwardly projecting flange.

8. The wall feedthrough fitting defined in claim 1 wherein the support tube has an inner end telescoping with the outer end of the guide tube.

9. The wall feedthrough fitting defined in claim 8 wherein the support-tube inner end engages around the guide-tube outer end.

10. The wall feedthrough fitting defined in claim 9, further comprising
    a layer of a lubricating and sealing substance on an outer surface of the guide tube between the guide-tube inner end and the support-tube outer end.

11. The wall feedthrough fitting defined in claim 1, further comprising
    means bonding the inner portion of the sleeve to the outer end of the support tube.

12. The wall feedthrough fitting defined in claim 11 wherein the bonding means is an adhesive.

* * * * *